(12) United States Patent
Janssen

(10) Patent No.: US 7,006,735 B2
(45) Date of Patent: Feb. 28, 2006

(54) LOSS-LESS ETENDUE-PRESERVING LIGHT GUIDES

(75) Inventor: Peter J. Janssen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/161,798

(22) Filed: Jun. 4, 2002

(65) Prior Publication Data
US 2003/0223237 A1 Dec. 4, 2003

(51) Int. Cl.
*G02B 6/26* (2006.01)
*G02B 6/27* (2006.01)

(52) U.S. Cl. .............. 385/47; 385/11; 385/32
(58) Field of Classification Search ............... 385/14, 385/15, 31–52, 11
See application file for complete search history.

(56) References Cited

U.S. PATENT DOCUMENTS

| | | | | |
|---|---|---|---|---|
| 3,181,088 A | * | 4/1965 | Eaglesfield et al. | 333/122 |
| 3,659,918 A | * | 5/1972 | Tan | 313/371 |
| 3,870,398 A | * | 3/1975 | Love | 385/47 |
| 4,130,342 A | | 12/1978 | McMahon | 350/96.14 |
| 4,460,939 A | * | 7/1984 | Murakami et al. | 362/609 |
| 4,747,653 A | * | 5/1988 | Kahn | 385/47 |
| 4,805,977 A | * | 2/1989 | Tamura et al. | 385/47 |
| 5,410,625 A | * | 4/1995 | Jenkins et al. | 385/28 |
| 5,525,190 A | * | 6/1996 | Wojnarowski et al. | 385/133 |
| 5,625,738 A | * | 4/1997 | Magarill | 385/146 |
| 5,812,713 A | * | 9/1998 | Allen et al. | 385/39 |
| 5,894,535 A | * | 4/1999 | Lemoff et al. | 385/47 |
| 6,331,993 B1 | * | 12/2001 | Brown | 372/55 |

FOREIGN PATENT DOCUMENTS

| | | |
|---|---|---|
| DE | 10043267 A | 3/2002 |
| DE | 10043267 A1 * | 3/2002 |
| EP | 0877264 A2 | 3/1998 |
| JP | 08314033 A * | 11/1996 |

OTHER PUBLICATIONS

Meyer-Arendt, "Introduction to Classical and Modern Optics", 1995, Prentice-Hall, Inc., 4th edition, pp. 13-14.*
Melles Griot, "The Practical Application of Light", 1999, Melles Griot, p. 10.2.*

* cited by examiner

*Primary Examiner*—Michelle Connelly-Cushwa

(57) ABSTRACT

A light guide comprises two or more straight light guide sections and one or more light coupling elements between sections to transport light from one section to another section. By having at least two TIR (totally internally reflecting) surfaces aligned with the light guiding direction of one of the light guiding sections, a light coupling element of the invention transports light from one light guide section to another with little or no light loss and little or no increase of etendue.

10 Claims, 4 Drawing Sheets

LOSS-LESS ETENDUE-PRESERVING LIGHT GUIDES

CROSS REFERENCE TO RELATED APPLICATION

U.S. patent application Ser. No. 10/161,753, filed 4 Jun., 2002, and assigned to the same Assignee as the present application, relates to a projection display system employing light guides of the invention of the present application.

BACKGROUND OF THE INVENTION

This invention relates to light guides, and more particularly relates to rigid light guides exhibiting low or no light loss while substantially preserving etendue of the guided light beam, regardless of changes in direction of the guided light beam or intersection of the guided light beam with other beams.

Rigid light guides such as solid or hollow light pipes, are an attractive, low-cost means for light collection, manipulation and transportation. Such light guides provide such functions in a much more compact volume than is possible with conventional optics. Unfortunately, with present light guide technology, bends or folds in the guides cause severe loss of light and increased etendue (cone angle), as illustrated in FIGS. 1A through 1D.

FIG. 1A shows schematically a straight light guide 10 and a guided light beam represented by outer ray traces 1 and 2. Note that the beam maintains the same cone angle as it travels along the guide, as indicated by the invariant angle $\alpha$ formed at the intersections of the traces. When a bend 11 is introduced into the guide 10, as shown in FIG. 1B, the cone angle is increased, as indicated by comparing angle $\beta$ formed by the intersection of outer ray 3 and central ray 4 prior to encountering the bend, and angle $\gamma$ formed by the intersection of these rays after the bend.

The increased cone angle of the guided beam means that fixed aperture collection devices may not be able to collect all of the light from the beam as it exits the light guide.

FIG. 1C shows another way in which light may be lost. When a second bend 12 is added to the light guide 10, some of the light, represented by outer ray traces 5 and 6, is reflected backward, as illustrated by ray 6, which reflects from an area just beyond the second bend to travel back along the bend 12 in the reverse direction, as ray 7.

FIG. 1D shows that a smooth bend 13 has an effect similar to that of the sharp bend 12 in FIG. 1B, ie, the cone angle of the guided beam is increased, as illustrated by the angle $\delta$ between rays 8 and 9 after the bend, compared to their parallel path (0 angle) before the bend.

Attempts to couple light guide sections with mirrors also leads to light loss, as shown in FIGS. 2A through 2C. In FIG. 2A, for example, the cone angle $\phi$ is such that the guided beam (indicated by outer rays 15 and 16) after exiting through exit aperture 17 of light guide 18 and being reflected by mirror 19, has an etendue too large for collection at entrance aperture 20 of light guide 21, resulting in significant coupling loss. Moving mirror 19 as close as possible so that it actually touches the edges of exit aperture 17 of light guide 18 and entrance aperture 20 of light guide 21, as illustrated in FIG. 2B, minimizes but does not eliminate the coupling loss. FIG. 2C shows the virtual image of the guided beam 22 after exiting from light guide 23 and reflection and before entry into light guide 24, illustrating the dependence of coupling loss on the cone angle $\theta$.

FIG. 2D illustrates that coupling loss can be reduced or eliminated by inserting relay lenses 25 and 26 into the path of the guided beam before and after reflection by mirror 19. These relay lenses 25 and 26 limit the extent of the guided beam so that it fits within the entrance aperture 20 of light guide 21, avoiding coupling losses. However, such relay optics are expensive and prevent the desired compact arrangement.

Alternatives such as fiber optic bundles are also expensive. Moreover, fiber optic bundles suffer significant insertion loss because of a relatively low packing density.

SUMMARY OF THE INVENTION

In accordance with the invention, a light guide comprises at least first and second light guide sections and one or more light coupling elements between the sections to transport light from one section to another section. By having at least two TIR (totally internally reflecting) surfaces, a first TIR surface adjacent to the exit aperture of the first light guide section and aligned with the light guiding direction of the second light guide section, and a second TIR surface adjacent to the entrance aperture of the second light guide section and aligned with the light guiding direction of the first light guide section, a light coupling element of the invention transports light from the first light guide section to the second light guide section with little or no light loss and little or no increase in etendue.

In one embodiment, two light guide sections are arranged with their light guiding directions at an angle to one another, for example, at a right angle, and are coupled with a wedge-shaped light coupling element having two TIR surfaces, a first TIR surface adjacent to the exit aperture of a first light guide and a second TIR surface adjacent to the entrance aperture of the second light guide. The light coupling element also has a reflecting surface set at an angle to the TIR surfaces, for reflecting light from the first light guide section to the second light guide section. The second TIR surface guides the light from the first light guide section to the reflecting surface, while the first TIR surface guides the reflected light to the second section. In such an arrangement, little or no light escapes during transport across the coupling element from one light guide to the other and little or no increase in etendue occurs.

By using multiple light coupling elements and light guide sections coupled at the same or different angles, transportation of light energy along an arbitrary path is enabled.

In another embodiment, a light coupling element with three or more TIR surfaces enables coupling three or more light guide sections. For example, a light coupling element with four TIR surfaces coupling four light guide sections in a crossed pattern makes it possible to independently transport light over two intersecting guide paths without cross coupling energy from one to the other and with little or no loss and little or no increase in etendue.

In another aspect of the invention, a light coupling element of the invention may incorporate one or more dichroic elements or surfaces having selective transmission and/or reflection passbands, enabling color splitting and/or recombination, with little or no light loss and little or no increase in etendue of the guided beam(s).

For example, in the intersecting-guide-path embodiment, crossed dichroic elements in the light coupling element enable splitting of a light beam from one light guide section into three components, which are each guided along one of the remaining three light guide sections. Alternatively, three component beams, each guided along a different light guide section toward the light coupling element, can be recombined by the crossed dichroic elements into a single beam, which is then guided along a remaining light guiding section.

The light guide sections of the invention may be solid elements of an optically transparent material, or may be hollow pipes having sidewalls with interior reflecting surfaces. A light guide of the invention may use only solid or only hollow sections, or a combination of solid and hollow sections, depending on the application. The cross-sections of the light guide sections will normally be rectangular, but may also be square or other regular polygon having an even number of sides.

As will be appreciated, light may pass through any of the light guides of the invention in either direction with no difference in outcome, except in those cases in which dichroic or polarizing elements or surfaces are employed. It should therefore be understood that the terms "entrance" and "exit" with respect to the faces and apertures of the elements of the various light guides described and claimed herein are used for convenience of description only. These terms are meant to be interchangeable and thus not to limit the utility of the invention to light travel in one direction only.

The invention is useful in a variety of light collecting, processing, transporting and distributing applications, in fields as diverse as illumination, displays, information processing and high power applications. Specific examples of applications within these fields include projection displays, backlighting for liquid crystal displays, automotive illumination, and welding.

BRIEF DESCRIPTION OF THE DRAWING

FIGS. 2A through 2D are schematic illustrations of rigid light guide sections of the prior art, having conventional optical couplings of mirrors (FIGS. 2A and 2B), air (FIG. 2C) and a combination of lenses and a mirror (FIG. 2D);

DETAILED DESCRIPTION OF THE INVENTION

Figures 1A, 1B, 1C, 1D:
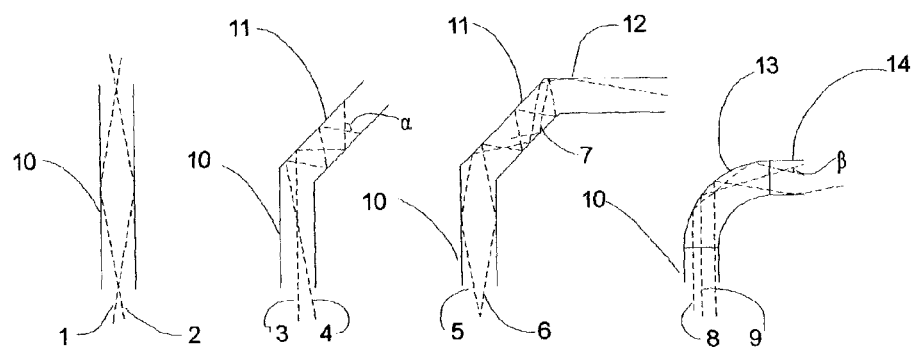
FIGS. 1A through 1D are schematic illustrations of rigid light guides of the prior art, having a straight configuration, a single sharp bend, two sharp bends and a smooth bend, respectively.
Figures 2A, 2B, 2D:
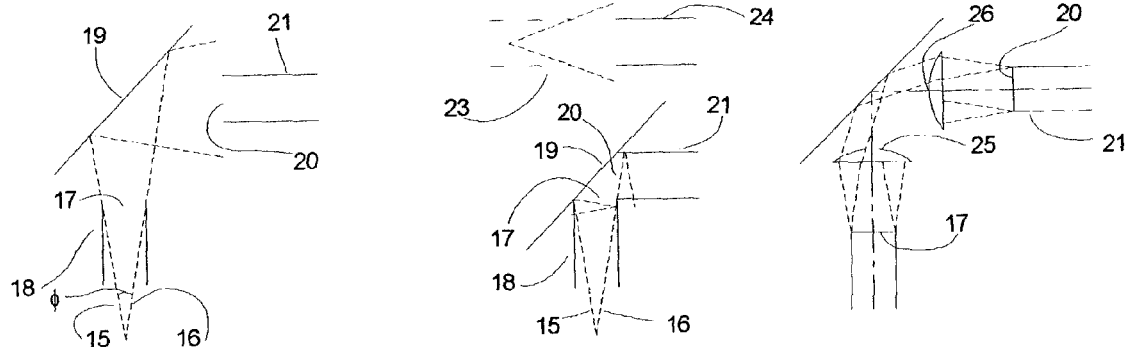
Figures 3A, 3B, 3C, 3D:
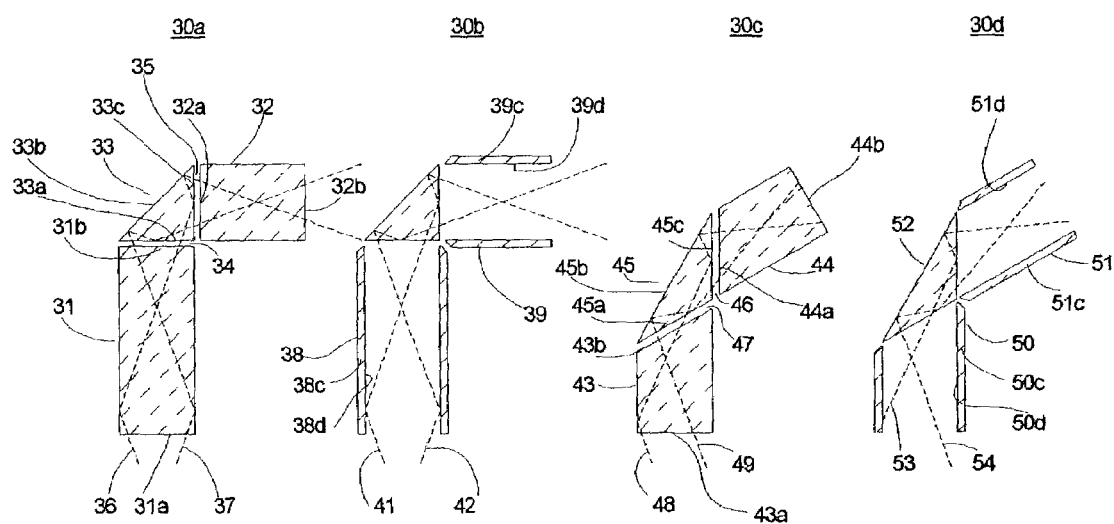
FIGS. 3A through 3D are schematic illustrations of rigid light guides of the invention, FIGS. 3A and 3B showing a solid and a hollow light guide, respectively, each having a right angle bend, and FIGS. 3C and 3D showing a solid and a hollow light guide, respectively, each having a 45 degree bend.

Referring to FIG. 3A of the drawing, there is shown one embodiment 30a of a light guide of the invention, including light guide sections 31 and 32, each with an entrance aperture (31a, 32a), an exit aperture (31b, 32b), and a side wall (31c, 32c). Positioned between exit aperture 31b of light guide section 31 and entrance aperture 32b of light guide section 32 is a wedge-shaped light coupling element 33, having two TIR (totally internally reflecting) faces, entrance face 33a and exit face 33c, and internally reflecting face 33b, extending at an angle to the TIR faces 33a and 33c.

The light coupling element 33 is of an optically transparent material. As used herein, the term "optically transparent" means that the material is able to transport light with little or no absorption of light. Suitable materials include, for example, glass and plastic, although any optically transparent material having an index of refraction higher than that of the external medium in contact with the surfaces 33a and 33c is suitable. The higher index of refraction enables these surfaces to behave as total internal reflection (herein "TIR") surfaces.

The TIR faces 33a and 33c of the light coupling element 33 are parallel to the light guiding direction (defined by the direction of the side walls) in the non-adjacent light guide sections 32 and 31, respectively, and in this embodiment, because the light guide sections 31 and 32 are arranged with their light guiding directions at right angles, the TIR faces 33a and 33c are also at right angles to one another.

In this embodiment, light guide sections 31 and 32 are of a solid optically transparent material, such as plastic or glass. Because of the higher refractive index of such a material relative to the surrounding medium, usually air, a light beam (represented by the outer rays 36 and 37) is confined within the light guide by the phenomenon of total internal reflection (herein "TIR").

Essentially, because light can travel from one medium to another only if it strikes the interface at or above a critical angle (relative to the surface), as determined by Snell's Law, light which strikes the interface below the critical angle is reflected. Because of the relatively small cone angle of the guided light beam, and the difference in refractive index of the light guide medium and its exterior surroundings (eg, air), the guided beam is totally internally reflected as it moves along the light guide.

When the beam (as indicated by the outer rays 36 and 37) reaches the exit aperture 31a of light guide 31, the steep angle at which it encounters this aperture allows it to exit the light guide section and enter the light coupling element 33 through entrance face 33a. As ray 36 encounters TIR exit face 33c at a low angle, it is reflected back to the reflecting surface 33c, and then is reflected back to encounter exit face 33c again, but this time at a steep angle, whereby the ray is enabled to enter light guide section 32 through entrance aperture 32a. Unlike ray 36, ray 37 first encounters reflecting surface 33, where it is reflected back toward TIR entrance face 33a at a low angle, and is thence reflected at a steep angle toward TIR face 33c, enabling it to pass into light guide section 32 through entrance aperture 32a.

Although the medium in the spaces (34, 35) between the light guide sections and the light coupling element can be air or other gas, this space may be filled with any other substance having a lower index than that of the light coupling element, for example, an adhesive layer such as a UV curing acrylic or epoxy.

FIG. 3B shows another embodiment of a light guide 30b of the invention, in which the solid light guiding sections 31 and 32 have been replaced with light pipes 38 and 39, each having an entrance aperture (38a, 39a), an exit aperture (38b, 39b), and a side wall (38c, 39c) having an interior reflective surface (38d, 39d). Thus, unlike the case of the solid light guide sections of FIG. 3A, in which rays 36 and 37 are reflected at the interface of side walls 31c and 32c with the surrounding medium by the phenomenon of TIR, rays 41 and 42 are reflected from the interior reflective surfaces 38d and 39d. In other respects, the operation of the light guide 30b is similar to that of 30a.

FIG. 3C shows yet another embodiment of a light guide 30c of the invention in which solid light guide section 44 is positioned with its light guiding direction (defined by the direction of the side wall 44c) at an angle of 45 degrees to the light guiding direction of the light guide section 43, instead of 90 degrees, as is the case in light guides 30a and 30b. As in these previously described embodiments, the TIR faces 45a and 45c of the light coupling element 45 are parallel to the light guiding direction in the nonadjacent light guide sections 44 and 43, respectively. However, in the present embodiment, this determines an angle of 135 degrees between the TIR faces 45a and 45c of the light coupling element 45. In order that the spaces 46 and 47 between TIR faces 45a and 45c and the adjacent light guide apertures 43b and 44a of light guide sections 43 and 44 are of equal thickness d (see FIG. 5) across the width of the apertures, these apertures 43b and 44a form an angle of 45 degrees with respect to the sidewalls 43c and 44c.

FIG. 3C shows yet another embodiment of a light guide 30c of the invention in which solid light guide section 44, having an entrance face 44a, an exit face 44b and sidewall 44c, is positioned with its light guiding direction (defined by the direction of the side wall 44c) at an angle of 45 degrees to the light guiding direction of the light guide section 43, instead of 90 degrees, as is the case in light guides 30a and 30b. The light coupling element 45 has a reflecting face 45b and TIR faces 45a and 45c. As in these previously described embodiments, the TIR faces 45a and 45c of the light coupling element 45 are parallel to the light guiding direction in the non-adjacent light guide sections 44 and 43, respectively. However, in the present embodiment, this determines an angle of 135 degrees between the TIR faces 45a and 45c of the light coupling element 45. In order that the spaces 46 and 47 between TIR faces 45a and 45c and the adjacent light guide apertures 43b and 44a of light guide sections 43 and 44 are of equal thickness d (see FIG. 5) across the width of the apertures, these apertures 43b and 44a form an angle of 45 degrees with respect to the sidewalls 43c and 44c. Outer ray traces 48 and 49 indicate the path of a light beam through the light guide.

FIG. 3D shows another embodiment of a light guide 30d of the invention in which solid light guide sections 43 and 44 have been replaced by hollow light pipe sections 50 and 51, having outer walls 50c and 51c, and inner walls 50d and 51d, respectively, which operate in the same manner as the hollow light pipe sections 38 and 39 in light guide 30b. Light pipe sections 50 and 51 are coupled by solid light coupling element 52. Outer ray traces 53 and 54 indicate the path of a light beam through the light guide.

Figures 4A, 4B, 4C:
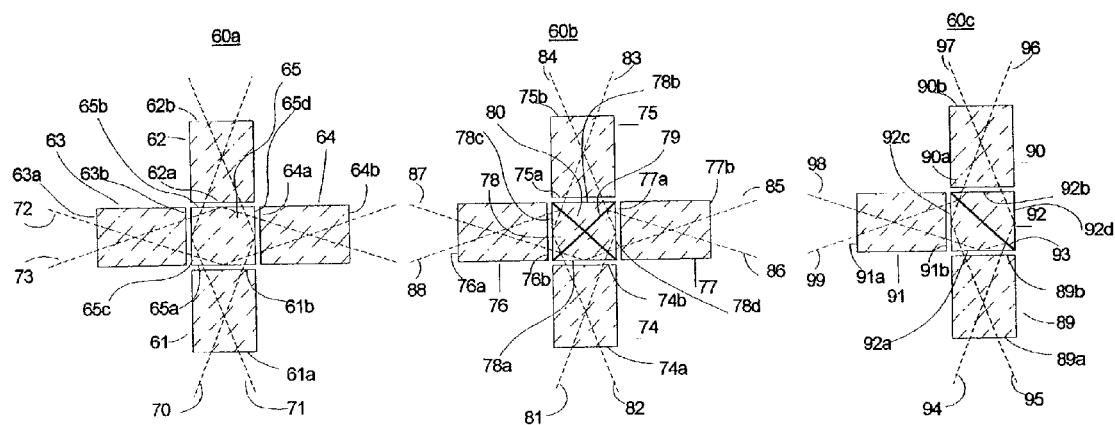
FIGS. 4A through 4C are schematic illustrations of intersecting, cross-coupling and beam-splitting rigid light guides of the invention, respectively.

In accordance with another embodiment of the invention, a light coupling element with four TIR surfaces enables the intersection of two independent light beams without cross coupling. FIG. 4A shows such an arrangement 60a in which a cube-shaped light coupling element 65 has TIR surfaces 65a through 65d. Four light guide sections 61 through 64 each have an entrance aperture (61a, 62a, 63a, 64a) and an exit aperture (61b, 62b, 63b, 64b) and a side wall (61c, 62c, 63c, 64c). The light guide sections 61 and 63 are positioned with their exit apertures 61b and 63b adjacent to TIR faces 65a and 65c, forming spaces 66 and 68, while light guide sections 62 and 64 are positioned with their entrance apertures 62a and 64a adjacent to TIR faces 65b and 65d, forming spaces 67 and 69.

In operation, the guided light beam indicated by outer ray traces 70 and 71 is guided by light guide section 61 into light coupling element 65, where it is totally internally reflected by TIR faces 65c and 65d into light guide section 62. Simultaneously, the guided light beam indicated by outer ray traces 72 and 73 is guided by light guide section 63 into light coupling element 65, where it is totally internally reflected by TIR faces 65a and 65b into light guide section 64. Thus, two guided light beams can have intersecting paths without cross coupling.

FIG. 4B shows a modification 60b of the arrangement of FIG. 4A in which two dichroic filter elements 79 and 80 are arranged in a crossed pattern in the light coupling element 78, having an entrance face 78a and exit faces 78b, 78c and 78d. Dichroic element 79 reflects red light and transmits green light while dichroic element 80 reflects blue light and transmits green light. Light guide sections 74, 75, 76, 77 each have an entrance face (74a, 75a, 76b, 77a) and an exit face (74b, 75b, 76a, 77b). In operation of this light guide 60b as a beam splitter, a white light beam indicated by outer ray tracings 81 and 82 is guided by light guide section 74 to light coupling element 78, where it encounters dichroic elements 79 and 80, and is split into a green component (ray traces 83 and 84), a red component (ray traces 85 and 86), and a blue component (ray traces 87 and 88), which are guided away from the light coupling element 78 by light guiding elements 75, 77 and 76, respectively.

In operation of the light guide 60b as a beam combiner, the directions of travel of the guided light beams is reversed, so that green, red and blue components entering light guide section 75, 77 and 76, respectively, are combined into a white light beam by dichroic elements 79 and 80, and the white light beam is carried away by light guide element 74.

FIG. 4C shows a modification 60c of the arrangement 60a of FIG. 4A in which a polarizing element 93 is arranged in the light coupling element 92. Light coupling element 92 has an entrance face 92a and exit faces 92b and 92c, and reflecting face 92d. Polarizing element 93 reflects S polarized (TM) light and transmits P polarized (TE) light. In operation of this light guide 60c as a polarizing beam splitter, a light beam indicated by outer ray tracings 94 and 95 is guided by light guide section 89, having entrance face 89a and exit face 89b, to light coupling element 92, where it encounters polarizing element 93, and is split into an S component (ray traces 98 and 99), and a P component (ray traces 96 and 97), which are guided away from the light coupling element 92 by light guiding elements 91 and 90, having entrance faces (90a, 91b) and exit faces (90b, 91a), respectively.

Many other combinations are possible. For example, in the light guide 60b, TIR surface 78b may be given a reflective surface and light guide section 75 eliminated, so that in the beam splitter mode, white light entering light guide section 74 is split into two components, rather than three. For another example, in any of the embodiments of FIG. 3, the reflective surface may be a dichroic surface, so that its reflectivity is selective for a certain wavelength band, enabling a narrowing of the wavelength range of the guided light beam as it passes through the light guide. Thus, for example, white light entering one light guide section can exit the coupled light guide section as red, green or blue light.

Figure 5:
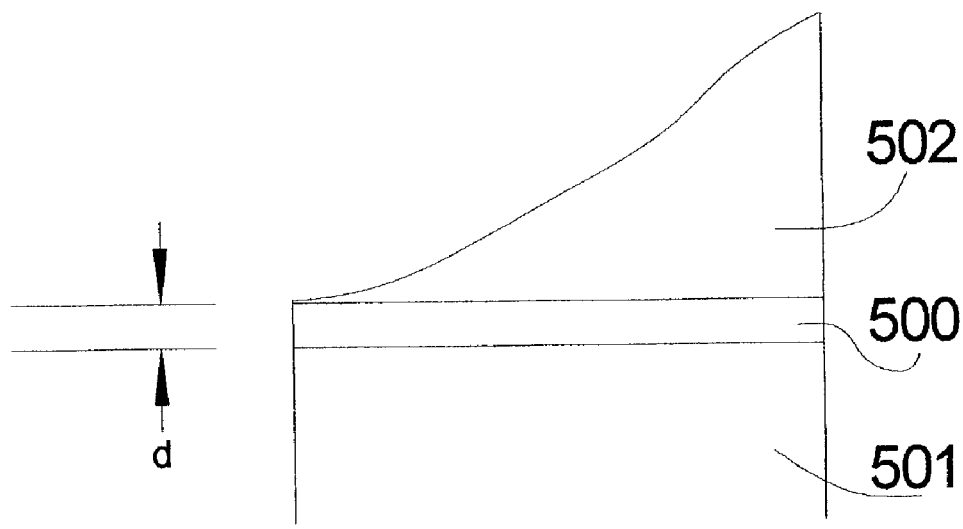
FIG. 5 is a detail view of the coupling region between a light guide section and a light coupling element, showing an adhesive layer filling the space between these elements.

FIG. 5 is a detailed view of an adhesive layer 500 filling the space between a light guide section 501 and a light coupling element 502 of the invention. The adhesive layer has a thickness d and a refractive index lower than that of the light coupling element 502.

Figure 6:
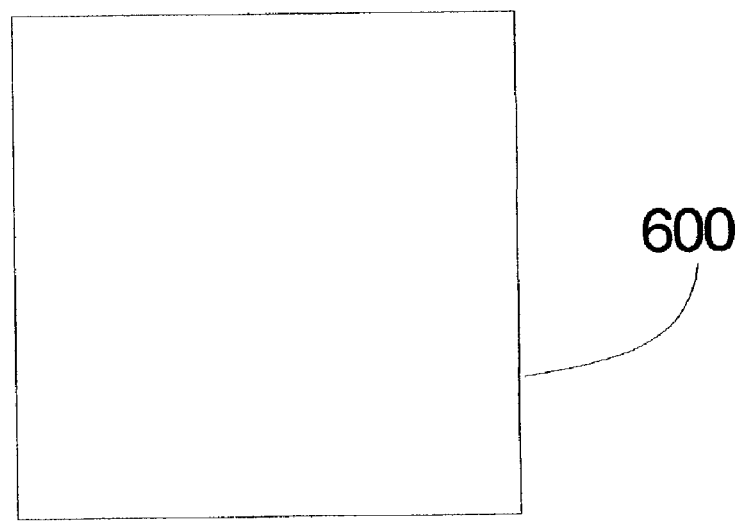
FIG. 6 is a cross section view of one of the light guide sections.

FIG. 6 is a cross section view 600 of light guide section 31, showing a square shape. Light guide sections of the invention can also have a rectangular or other polygonal shape with an even number of sides.

The invention has necessarily been described in terms of a limited number of embodiments. From this description, other embodiments and variations of embodiments will become apparent to those skilled in the art, and are intended to be fully encompassed within the scope of the invention and the appended claims.

What is claimed is:

1. A light guide comprising:
at least first, second, third and fourth light guide sections; and
at least one light coupling element between the light guide sections;
the light guide sections each having an entrance aperture, an exit aperture and at least first and second guide walls defining a light guiding direction;
the light coupling element being composed of an optically transparent material having first, second and third entrance faces each with a TIR surface, and an exit face with a TIR surface, the TIR surfaces of the first, second and third entrance faces being adjacent to the exit apertures of the first second and third light guide sections, respectively, the TIR surface of the first entrance face being substantially colinear with the first guide wall of the second light guide section, the TIR surfaces of the second and third entrance faces being substantially colinear with the first and second guide walls of the fourth light guide section, and the TIR surface of the exit face being adjacent to the entrance aperture of the fourth light guide section and being substantially colinear with the second guide wall of the second light guide section;
the light coupling element also having an internal surface which is either a dichroic surface for reflecting light of a predetermined reflection band, or a polarizing surface for reflecting light of a predetermined polarization state;
the light coupling element having two dichroic elements.

2. A light guide comprising:
at least first, second, third and fourth light guide sections; and
at least one light coupling element between the light guide sections;
the light guide sections each having an entrance aperture, an exit aperture and at least first and second guide walls defining a light guiding direction;
the light coupling element being composed of an optically transparent material having first, second and third entrance faces each with a TIR surface, and an exit face with a TIR surface, the TIR surfaces of the first, second and third entrance faces being adjacent to the exit apertures of the first second and third light guide sections, respectively, the TIR surface of the first entrance face being substantially colinear with the first guide wall of the second light guide section, the TIR surfaces of the second and third entrance faces being substantially colinear with the first and second guide walls of the fourth light guide section, and the TIR surface of the exit face being adjacent to the entrance aperture of the fourth light guide section and being substantially colinear with the second guide wall of the second light guide section;
the light coupling element also having an internal surface which is either a dichroic surface for reflecting light of a predetermined reflection band, or a polarizing surface for reflecting light of a predetermined polarization state;
the light coupling element having a polarizing element.

3. A light guide comprising:
first, second and third light guide sections; and
a light coupling element between the light guide sections;
the light guide sections each having an entrance aperture, an exit aperture and at least first and second guide walls defining a light guiding direction;
the light coupling element being composed of an optically transparent material having first and second entrance faces each with a TIR surface, an exit face with a TIR surface, and a reflecting face, the TIR surfaces of the first and second entrance faces being adjacent to the exit apertures of the first and second light guide sections, respectively, the TIR surface of the first entrance face being substantially colinear with the first guide wall of the second light guide section, the TIR surfaces of the second entrance face being substantially colinear with the second guide wall of the first light guide section, and the TIR surface of the exit face being adjacent to the entrance aperture of the third light guide section and being substantially colinear with the first guide wall of the first light guide section, and the reflecting face being substantially colinear with the second guide walls of the second and third light guide sections;
the light coupling element also having an internal polarizing surface for reflecting light of a predetermined polarization state.

4. The light guide of claim 3 in which the cross sections of the light guide sections have the cross sectional shape of an even-numbered polygon.

5. The light guide of claim 3 in which at least the first light guide section is a solid element of an optically transparent material, and the entrance face of light coupling element adjacent to the exit aperture of the solid first light guide section is spaced a distance apart from the exit aperture of light guide section, to form a space between the entrance face of light coupling element and the exit aperture of the solid light guide section.

6. The light guide of claim 5 in which the space is filled with air.

7. The light guide of claim 5 in which the space is filled with an optically transparent material having an index of refraction less than that of the material of the light coupling element.

8. The light guide of claim 5 in which the distance d between the entrance face of light coupling element and the exit aperture of the solid light guide section is substantially the same across the width of the space.

9. The light guide of claim 3 in which at least the first light guide section is a hollow conduit having a guide wall with an interior reflective surface.

10. A light guide comprising:
at least first, second, third and fourth light guide sections; and
at least one light coupling element between the light guide sections;
the light guide sections each having an entrance aperture, an exit aperture and at least first and second guide walls defining a light guiding direction;
the light coupling element being composed of an optically transparent material having first, second and third entrance faces each with a TIR surface, and an exit face with a TIR surface, the TIR surfaces of the first, second and third entrance faces being adjacent to the exit apertures of the first second and third light guide sections, respectively, the TIR surface of the first entrance face being substantially colinear with the first guide wall of the second light guide section, the TIR surfaces of the second and third entrance faces being substantially colinear with the first and second guide walls of the fourth light guide section, and the TIR surface of the exit face being adjacent to the entrance aperture of the fourth light guide section and being substantially colinear with the second guide wall of the second light guide section;

the light coupling element also having an internal surface which is a polarizing surface for reflecting light of a predetermined polarization state.

* * * * *